United States Patent
Wooten

[11] Patent Number: 6,061,411
[45] Date of Patent: May 9, 2000

[54] METHOD AND APPARATUS FOR SYNCHRONIZING A SERIAL BUS CLOCK TO A SERIAL BUS FUNCTION CLOCK

[75] Inventor: David R. Wooten, Spring, Tex.

[73] Assignee: Compaq Computer Corporation, Houston, Tex.

[21] Appl. No.: 08/577,625

[22] Filed: Dec. 22, 1995

[51] Int. Cl.[7] .............................. H04L 7/00; H04L 25/36; H04L 25/40

[52] U.S. Cl. .......................... 375/372; 375/371; 370/516; 395/200.64

[58] Field of Search .................................. 375/354, 371, 375/372, 377, 376; 370/508, 503, 516; 340/825.2, 825.3; 395/200.64, 200.78, 553

[56] References Cited

U.S. PATENT DOCUMENTS

| | | | |
|---|---|---|---|
| 4,761,800 | 8/1988 | Lese et al. | 375/362 |
| 4,945,548 | 7/1990 | Iannarone et al. | 375/372 |
| 5,202,904 | 4/1993 | Kamada | 375/372 |
| 5,249,271 | 9/1993 | Hopkinson et al. | 395/250 |
| 5,311,511 | 5/1994 | Reilly et al. | 375/372 |
| 5,323,426 | 6/1994 | James et al. | 375/372 |
| 5,327,430 | 7/1994 | Urbansky | 375/372 |
| 5,359,605 | 10/1994 | Urbansky et al. | 375/372 |
| 5,434,860 | 7/1995 | Riddle | 370/84 |
| 5,434,891 | 7/1995 | Mery et al. | 375/377 |
| 5,448,571 | 9/1995 | Hong et al. | 370/105.4 |
| 5,504,757 | 4/1996 | Cook et al. | 370/84 |
| 5,535,209 | 7/1996 | Glaser et al. | 370/84 |
| 5,543,853 | 8/1996 | Haskell et al. | 348/497 |
| 5,544,324 | 8/1996 | Edem et al. | 395/200.17 |
| 5,563,890 | 10/1996 | Freitas | 375/372 |
| 5,598,445 | 1/1997 | Castano Pinto et al. | 375/372 |
| 5,640,388 | 6/1997 | Woodhead et al. | 370/468 |
| 5,778,218 | 7/1998 | Gulick | 395/558 |

*Primary Examiner*—Chi H. Pham
*Assistant Examiner*—Bryan Webster
*Attorney, Agent, or Firm*—Akin, Gump, Strauss, Hauer & Feld, LLP

[57] ABSTRACT

A method and apparatus of synchronizing a serial bus data rate to a serial bus function data rate to eliminate the build up of overruns or underruns of data. A response is provided to a start of frame packet. The response packet contains a response code for indicating a modification to the serial bus frame counter. Thereby, slight variations in data rates can be eliminated by adjusting the serial bus data rate instead of the serial bus function data rate.

24 Claims, 5 Drawing Sheets

METHOD AND APPARATUS FOR SYNCHRONIZING A SERIAL BUS CLOCK TO A SERIAL BUS FUNCTION CLOCK

BACKGROUND OF THE INVENTION

1. Field of the Invention

The invention relates to data rate synchronization of two devices and more particularly to the synchronization of a serial bus data rate to the data rate of an isochronous serial bus device.

2. Description of the Related Art

Computer systems are becoming ever more powerful with each passing moment. Many new advanced bus structures such as PCI or Peripheral Component Interchange bus have been developed to allow greater performance of the computer system. Additionally, new devices and uses are being developed for the computer systems. In the past the computer has been essentially a standalone device or networked with other computer systems. However, today the modern personal computer is becoming a much more connected and multimedia oriented system. For example, now high speed video and audio devices are becoming commonplace and the integration with the telephone system has already begun.

However, many of these new functions are well below the ultimate bandwidth or capability of the advanced buses such as the PCI bus. Therefore, it is not efficient to connect each one of the new functions and devices to the PCI bus directly, as this would impact bus loading and greatly increase overall costs. Additionally, many of these new functions are essentially serial in nature, with the data transferred in a bit stream rather than over a parallel bus structure. This is provided for many reasons, such as reduced wiring costs and can be done because of the lower data rates which are required.

Therefore, it has been proposed to develop a serial bus organization to connect all of these various lower bandwidth devices. The serial bus is organized with a host controller having a series of ports, which can then be connected either directly to devices or functions or to further hubs which have below them further devices or functions. A hub or the host controller may in addition incorporate functions if desired. In this manner a tree structure can be developed to allow a reasonable number of functions or devices to be attached to the serial bus system. The host controller connects to a bus in the computer system, for example the PCI bus, through the host controller. By having the host controller act as a concentrator, only a single connection to the PCI bus is necessary. The connection is better able to utilize the performance of that PCI bus without requiring numerous connections.

The host controller, each hub, and each function or port contain particular control registers for performing set up and initialization operations. In addition, four basic types of data transfer are defined in the serial bus system. The first type is isochronous, which is effectively a continuous real time transfer, such as telephony information or audio information. The second type is asynchronous block transfers, such as printer operations and conventional serial port operations, while the third type is asynchronous interactive device transfers, such as keyboard, mouse, pointing device, pen interfaces, and the configuration and status information, generally referred to as the control information, of the various devices. The fourth type is a polling or interrupt type which is used to periodically access a device to determine if it has any status change to report back to controlling software for the device.

Information is transferred over the serial bus during a window or period of time known as a frame. The host controller is responsible for generating the frame timing for the serial bus. The frame period is further divided into smaller time slots according to a prioritization scheme and the data requirements of the serial bus devices requiring service. Each device is generally allocated one time slot each frame, thus, the serial bus devices have relatively low data rates as compared to the relatively high serial bus data rate. For example, an isochronous device with a 64 Kbps data rate requirement can easily be satisfied by the 12 Mbps serial bus data rate. Thus, while the instantaneous transfer data rate to the isochronous device would be at the 12 Mbps serial bus data rate, because only a small portion of time per frame is required, the data rate of 64 Kbps can be effectively achieved with the small bursts of high speed data and a data buffer.

Information is broadcast over the serial bus system from the host controller in a series of packets, with the host controller acting as the bus master and hubs and devices only responding upon request or polling access of the host controller. The packet types include data packets, token packets for use from host to device, a handshake packet and a special control packet. Data packets are the isochronous, asynchronous block, and asynchronous control types. Token packets allow transfer of data packets. Handshake packets are used to perform a ready handshake after transfer of a data or control packet to acknowledge successful receipt or indicate unsuccessful receipt. Special control packets are used for logical reset and status request transfers. More details are found in the Universal Serial Bus Specification, version 0.9, published by Intel Corp., hereby incorporated by reference.

Since isochronous transfers by definition require a steady stream of data in real time, one particularly important concern is for isochronous devices to synchronize to the serial bus data rate to prevent overruns or underruns of data. One method of synchronizing the data flow is to exchange a predetermined amount of data during each frame according to the data requirement of the isochronous device. This method provides a great deal of synchronization, but if the clocks do not have a common denominator or if the clock frequencies drift, a serious overrun or underrun of data could gradually build over several frames of data. Therefore it is desirable to provide further synchronization as to the clock of the isochronous device to synchronize to the clock of the host controller.

With regard to providing synchronization to serial bus devices, a special type of token packet called a start of frame (SOF) packet is provided by the host controller. As part of the SOF packet, a time stamp, or clock tick, is provided for devices attached to the serial bus to differentiate frames and to synchronize to the serial bus clock. Thus, the host controller is the clock master with regard to serial bus timing. The period of time from one SOF packet to a subsequent SOF packet is defined as a frame, typically 1 ms.

However, some isochronous devices receive their clock from an external source and therefore cannot modify their data rates to match the serial bus clock rate. One such example is an Integrated Services Digital Network (ISDN) device. ISDN devices receive a fixed clock from the telephone line and, thus, cannot modify their clock to synchronize to the serial bus clock. Thus, even if the data rates are matched, if the clocks do not have a common denominator or if the clock frequencies drift over a period of time, an overrun or underrun of data could accumulate causing a loss of data.

Therefore, as it is desired to not preclude the use of ISDN or similar devices on the serial bus, it is therefore desirable to devise a method or apparatus for allowing the isochronous device and the serial bus to operate in synch so as to supply a steady stream of data without overruns or underruns. It is further desirable to allow the isochronous device to act as the serial bus clock master and account for small variations in clock changes.

SUMMARY OF THE PRESENT INVENTION

A method and apparatus for synchronizing a serial bus data rate to a serial bus function data rate includes a dual-ported buffer for receiving data at one data rate and providing data at another data rate. Data is provided to the serial bus functions during a frame. After each start of frame a variance in the data rates is determined and a response is provided to a host controller for modifying the frame timing. Thus, for serial bus functions having externally supplied clocks for transferring data, the externally fixed serial bus function data rate can be synchronized to the serial bus data rate by modifying the serial bus data rate.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
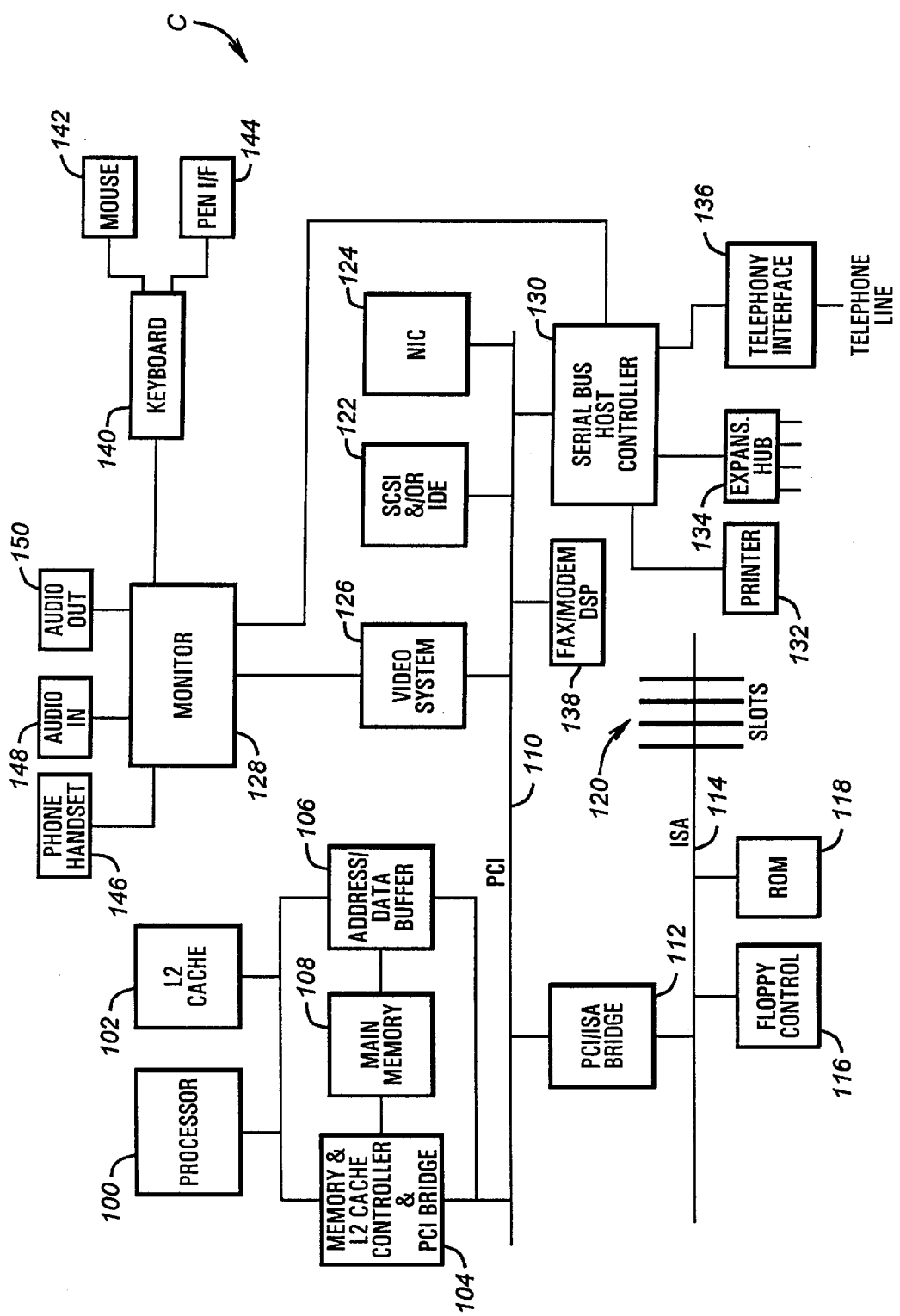
FIG. 1 is a block diagram of a computer system incorporating a serial bus system according to the preferred embodiment.

Referring now to FIG. 1, the computer system C according to the preferred embodiment is generally shown. The computer system C includes a processor 100 such as a Pentium® or 586 processor by Intel or their equivalents. It is understood that other processors could of course be utilized. The processor 100 is connected to a second level or L2 cache 102 and to a memory and L2 cache controller and PCI bridge 104 and address and data buffer 106. The main memory 108 of the computer system C is connected between the memory and L2 cache controller 104 and the address and data buffer 106. It is understood that the processor 100, cache 102, memory and cache controller 104, address and data buffer 106 and main memory 108 form the processor system and processor to PCI bus bridge according to a PCI system. It is understood of course that alternate processor systems and high speed bus architectures could be utilized if desired. Further, the address buffering could be included in the PCI bridge 104.

The PCI bridge 104 and address and data buffer 106 are connected to a PCI bus 110 which performs the high speed high performance back bone of the computer system C. A PCI to ISA (Industry Standard Architecture) bridge 110 is connected between the PCI bridge 110 and an ISA bus 114. A floppy disk controller 116 is connected to the ISA bus 114, as is the system ROM (read only memory) 118. Additionally, there may be a plurality of ISA slots connected to the ISA bus 114 for receiving interchangeable cards.

The majority of the devices are connected to the PCI bus 110. For example, a SCSI or IDE (Intelligent Drive Electronics) controller 122 is connected to the PCI bus 110 and to the associated disk drives and other devices (not shown). A network interface card (NIC) 124 is also connected to the PCI bus 110 to allow high performance network connections. Further, a video graphics system 126 is connected to the PCI bus 110 and to an associated monitor 128. A fax/modem DSP (digital signal processor) 138 can also be connected to the PCI bus 110 for fax and modem data processing. As noted, this is an exemplary computer system architecture and is provided for explanation, variations being readily apparent to one skilled in the art.

Of interest to the present description, a serial bus host controller 130 is also connected to the PCI bus 110. The serial bus host controller 130 of the illustrated embodiment acts as both a host controller and a hub, with various hubs and functions connected to the host bus controller 130. In the nomenclature of the invention, a "hub" is a device that acts as a wiring concentrator, thus converting a single attachment point into multiple attachment points. A "function" is a device that provides a capability to the computer system C, and a "device" refers generally to hubs or functions.

A printer 132 is connected to one port of the serial bus host controller 130, while an expansion hub 134 providing for further expansion capabilities is connected to a second port. A telephony interface 136 containing the necessary CODEC and DAA components is connected to a third port and also receives a telephone line. The telephone line can be any of the available types such as an analog line, an ISDN line, a PBX connection and so on, but for purposes of this description, the telephone line is conveniently an ISDN line.

In the illustrated embodiment, the monitor 128 further acts as a hub and as a node. The monitor 128 is thus connected to one port of the serial bus host controller 130. The node or device function of the monitor 128 allows configuration of the monitor 128 independent from the high speed data utilized in the video system 126. The monitor 128 preferably acts as a hub because of the conventional physical arrangement of a modern computer system. Preferably, the system unit which contains the other devices is located under the desk or in a relatively remote location, with only the monitor 128, a keyboard 140, a pointing device such as a mouse 142 or pen 144, a telephone handset 146, and microphone and speakers relatively accessible to the user. As the monitor 128 effectively forms the central core of this unit, it is logically a proper location for a hub. The telephone handset 146 could be connected to one port of the monitor hub to receive digitized analog information either directly from the telephony interface 136 or as otherwise available, such as from an answering machine or voice mail function. The microphone is part of audio input circuitry 148 which is connected to a second port of the monitor hub, while audio output circuitry 150 contains the speakers used for audio output. The keyboard 140 further acts as a hub itself and a node, in that it is connected to the monitor hub but further contains ports to connect to the mouse 142 and a pen or stylus pointing device interface 144. This further physical connection is appropriate as those are the primary input devices and they are in most cases generally relatively near the keyboard 140 to ease use or operation.

Thus it can be seen that the relatively lower data rate operations are connected to the serial bus host controller 130 according to the serial bus system. Preferably, the printer 132 is set up and used with higher bandwidth asynchronous block transfers, while the telephony interface 136, the phone handset 146 and, in most cases, the audio input circuitry 148 and the audio output circuitry 150 are isochronous devices. The keyboard 140, mouse 142 and pen interface 144 can be treated as polled interrupt devices. In all cases, each one of the particular devices connected over the serial bus system includes control ports and configuration registers which need to be accessed by the processor 100 via the serial bus host controller 130 to allow control and setup of the individual devices.

Figure 2:
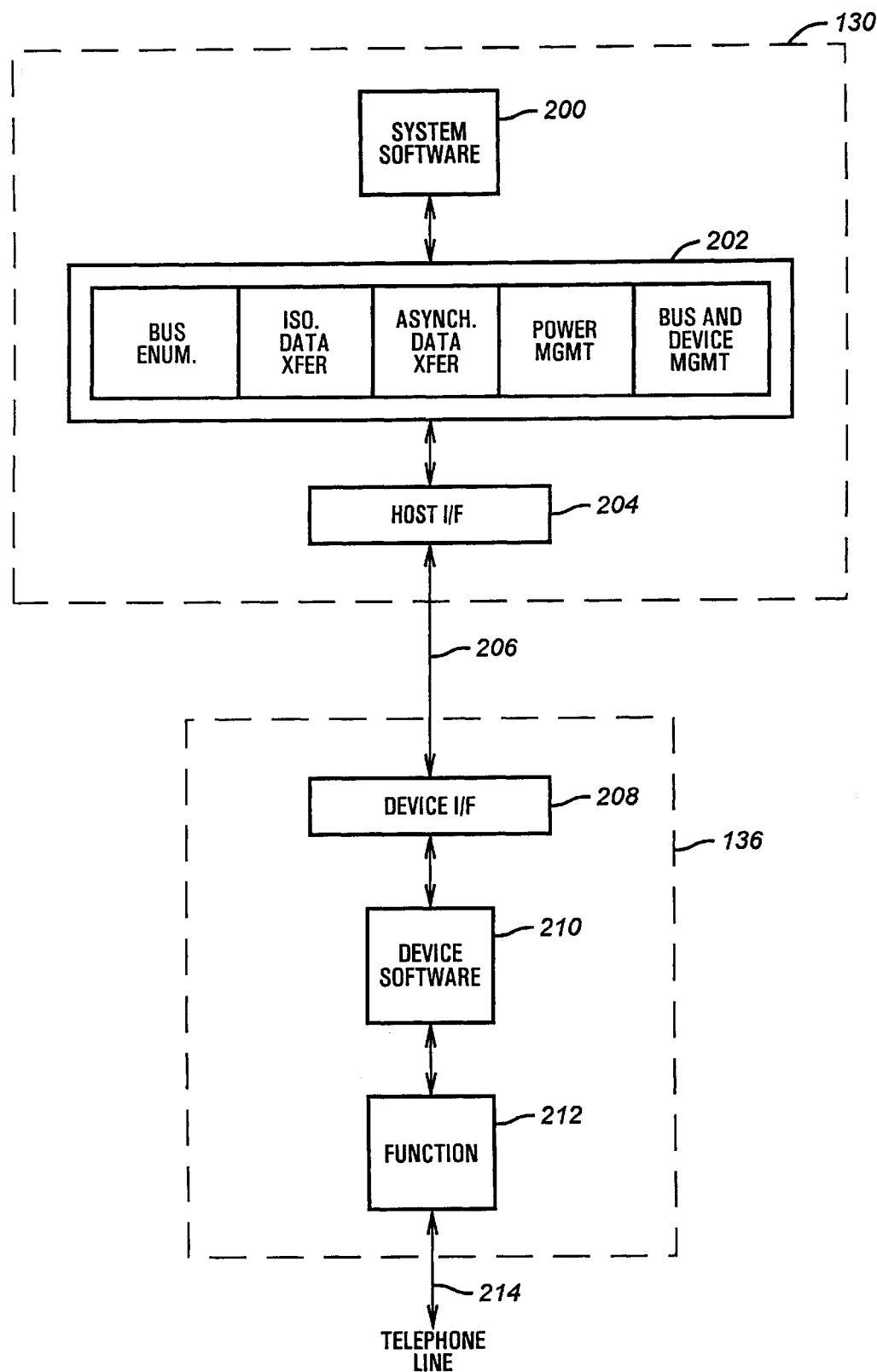
FIG. 2 is a block diagram illustrating logical partitioning of the various software and hardware components in a host controller and function according to the preferred embodiment.

Now referring to FIG. 2, logical divisions of the serial bus host controller 130 and the telephone interface 136 are illustrated. The serial bus host controller 130 is shown logically divided into a device software portion 202, a host interface portion 204 and a system software portion 200. The device software 202 interacts with the system software module 200 for communicating with the computer system C. The device software 202 interacts with the system software 200 and the host interface 204 to provide host controller services, such as: bus enumeration and configuration; isochronous data transfers; asynchronous data transfers; power management; and device and bus management functions. The host interface 204 is the hardware layer providing various control and data logic for transferring data over a serial bus cable 206.

The host controller 130 is shown coupled to the ISDN telephone interface 136 by the serial bus cable 206. It is understood that the serial bus is a tiered star topology, and therefore while logically many devices are connected to the serial bus, physically only two devices are connected by a single point-to-point serial bus cable, such as the serial bus cable 206. The serial bus preferably operates at a 12 Mbps clock rate. In the telephone interface 136 a device interface 208 is connected to the serial bus cable 206 for communicating with the host controller 130 on the physical layer. The telephone interface 136 is logically divided into a device software portion 210 and a function portion 212. The device software 210 interacts with the device interface 208 and the function 212 to transact control and data functions on the telephone interface 136. An ISDN telephone line 214 is connected to the function 212 for ISDN communications at clock rate of 64 kHz and an effective data rate of 192 kbps with data compression techniques.

Bus transactions between the host controller 130 and the telephone interface 136, and other serial bus devices, involve the transmission of packets of data. Preferably the packets are developed at the software layers 130 and 210 and transmitted on the serial bus 206 by the hardware layers 204 and 212. Three kinds of packets are supported: token packets; data packets; and handshake packets. All transfers over the serial bus begin by issuing a token packet. Most transfers are followed by a data packet, which is followed by a handshake packet.

Figure 3:
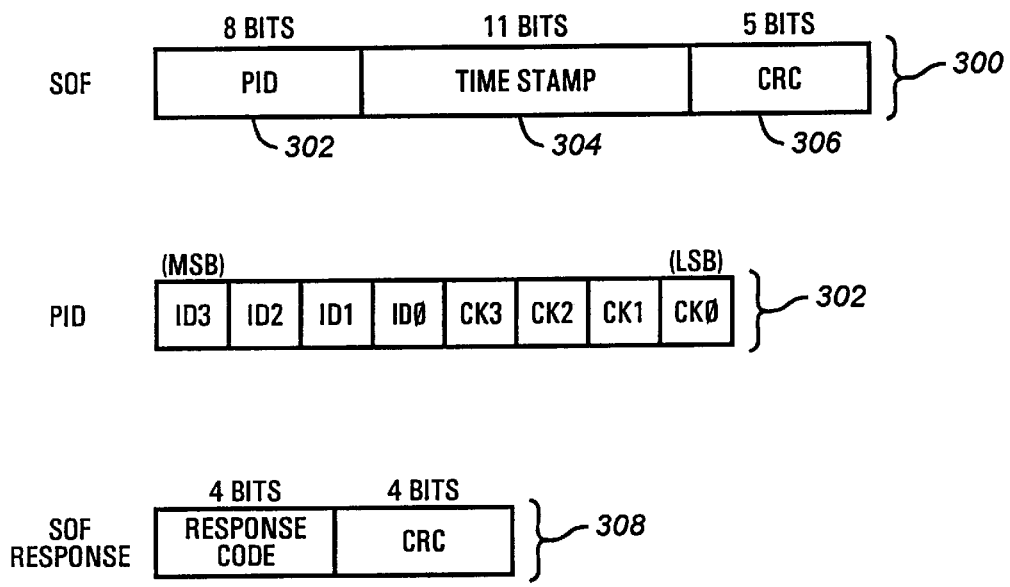
FIG. 3 is a block diagram illustrating a start of frame packet and a response packet.

Turning now to FIG. 3, one particular type of token packet is a start of frame (SOF) packet 300. Start of frame packets are sent by the host controller 130 preferably every 1.0 ms±0.01%. The SOF packet 300 is received by every device connected to the serial bus, including the telephone interface 136, for synchronizing the devices to the serial bus clock. Thus, the host controller 130 is the clock master with regard to the other serial bus devices. In response to the SOF packet 300, one serial bus device, such as the telephone interface 136, may issue a handshake or response to the SOF packet 300 to command the host controller 130 to modify its clock rate. In this respect, the device responding to the SOF packet becomes the clock master over the host controller.

For an isochronous device this is particularly important since data is continuous and real-time in creation, delivery and consumption. Timing is essential to maintain a steady rate of data at the rate required by the isochronous device, such as the ISDN telephone 136. Thus, glitches or delivery delays may cause data loss or buffer overruns or underruns. Further, since the isochronous device is clocked independently from the serial bus and a common denominator may not exist, there is further potential for data overruns or underruns as the data rates may be slightly out of synch. For example, the ISDN clock rate of 64 kHz can be divided by 64 to produce the 1 ms frame period, but it is contemplated that an isochronous device could have a clock rate not divisible as such. Further, over a period of time, data overruns or underruns may develop as each clock may drift about its spaced frequency but still within its tolerance range. For asynchronous devices this is generally not a problem, as they have no sample rates as such.

However, for certain isochronous devices, such the ISDN telephone 136 which receives a very stable clock from the phone line, the isochronous device cannot adjust its data rate to synchronize to the serial bus clock. The differences in the clocks are typically very small, on the order of 0.1%. Therefore, by providing a mechanism for adjusting the host controller generated frame rate, the differences in the clock rates can be accounted for and the clocks can be effectively synchronized.

The SOF packet 300 has a packet identifier (PID) field 302, a time stamp field 304 and a CRC checksum field 306. The first four bits of the PID 302 contain a packet number and the least significant four bits contain a check field to insure reliable decoding of the remainder of the packet The SOF packet 300 further contains a time stamp 304 for indicating to all the serial bus devices that a new frame is starting. The time stamp 304 is essentially an 11-bit clock tick incremented by the host controller every frame to distinguish sequential frames. The CRC field 306 provides a check of the time stamp. The SOF packet 300 is a token-only packet, meaning that it is not typically followed by a data packet or a handshake packet. There is one exception.

The telephone interface 136 provides a SOF response or handshake 308 upon receipt of the SOF packet 300 to indicate the difference in data rates between the ISDN clock and the serial bus clock or to indicate which way to adjust the serial bus clock. The four most significant bits of the SOF response packet 308 contain a response code for indicating how much the serial bus frame period is to be modified and the four least significant bits contain a CRC check code. By incrementing or decrementing the period of the frame, the data rate of the serial bus can be equalized or synchronized with respect to the data rate of the telephone interface 136. Other formats for the SOF response are contemplated to provide an adjustment indication.

Figure 4:
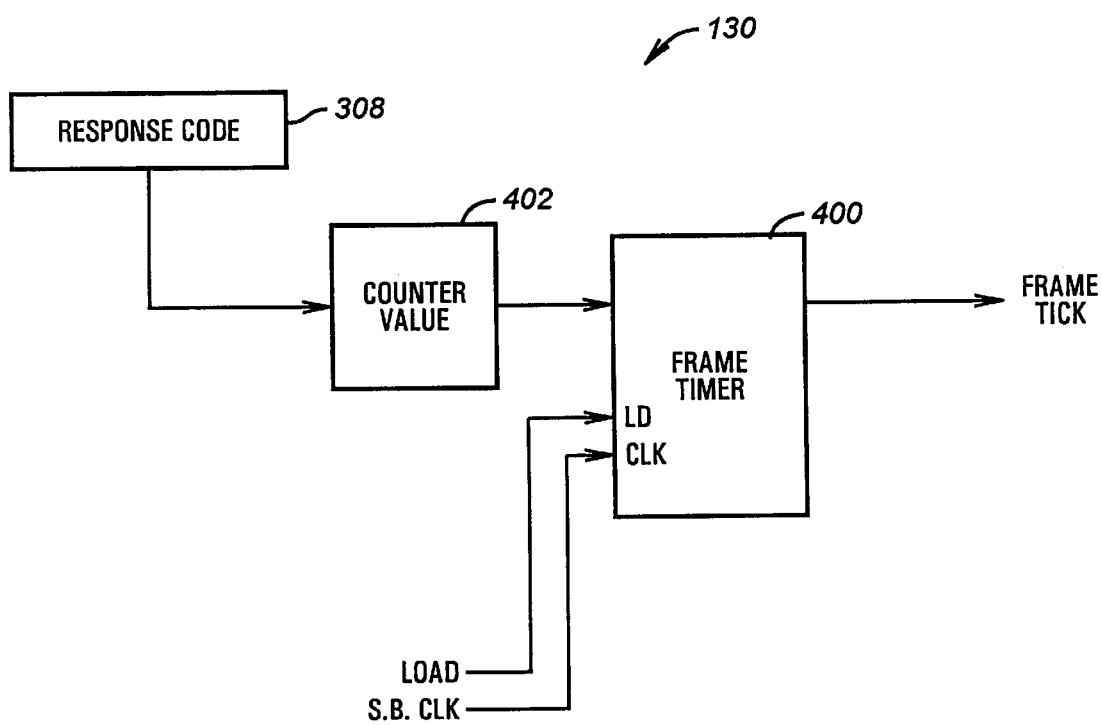
FIG. 4 is a block diagram illustrating a frame timer.

Now referring to FIG. 4, the host controller 130 is shown to include a frame timer 400 for providing a frame tick or end of frame indication which is used for generating the start of frame packet. Before each start of frame, the timer 400 receives a load indication for loading a counter value 402 which represents the number of serial bus clocks in a frame, preferably 11,999 for a 1.0 ms frame. A clock indication is received by the timer for counting down the frame time. The clock indication is preferably at the serial bus clock of 12 MHz, thus, a count of 11,999 to zero results in a 1.0 ms frame. The response packet 308 provides the response code for adjusting the counter value 402 according to the change in frame time desired. Table 1 illustrates one example of counter values and response codes according to conveniently chosen response codes.

TABLE 1

| Response Code | Counter Value | Effective Divisor | % Change in SOF Rate |
|---|---|---|---|
| 0xB | 0x2EDB | 11,996 | +0.0333% |
| 0xC | 0x2EDC | 11,997 | +0.0250 |
| 0xD | 0x2EDD | 11,998 | +0.0167 |
| 0xE | 0x2EDE | 11,999 | +0.0083 |
| 0xF | 0x2EDF | 12,000 | 0.0 |
| 0x0 | 0x2EE0 | 12,001 | −0.0083 |
| 0x1 | 0x2EE1 | 12,002 | −0.0167 |
| 0x2 | 0x2EE2 | 12,003 | −0.0250 |
| 0x3 | 0x2EE3 | 12,004 | −0.0333 |

Thus, for each frame a new counter value 402 is loaded into the frame timer 400 based on the response packet 308.

Figure 5A:
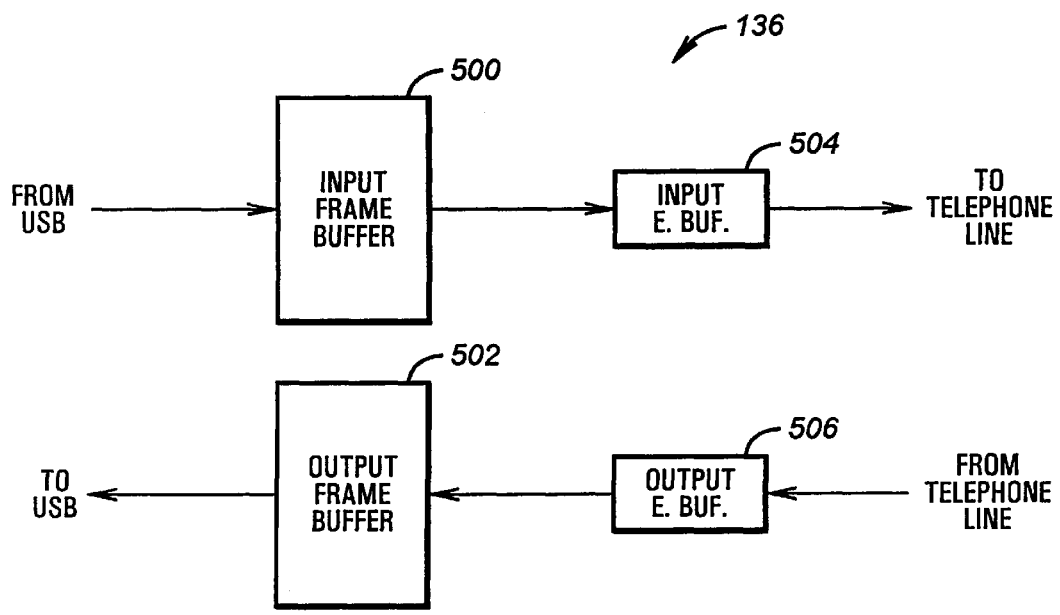
FIGS. 5A and 5B are block diagrams illustrating alternative embodiments of the frame buffers including means for determining data rates.

A preferred embodiment of the invention is best described with reference to FIGS. 5A and 5B. Turning first to FIG. 5A, the telephone interface 136 contains a pair of elasticity buffers 504 and 506 which are connected to respective ones of dual ported frame buffers 500 and 502. As shown, the input frame buffer 500 and elasticity buffer 504 handle input data and the output frame buffer 502 and elasticity buffer 506 handle output data. Since data is added and removed from a frame buffer at the same time, preferably the frame buffers 500 and 502 are sized to hold about two frame's worth of data. The elasticity buffers 504 and 506 are conveniently provided to determine the small variances in the serial bus clock rate and ISDN clock rate. Since clock differences are normally very small, a 9-bit elasticity buffer is conveniently adequate. However, other buffer sizes are contemplated. In the foregoing description of buffers 500 and 504, it is understood that the output buffers 502 and 506 provide the similar functionality, but only operating in a reverse direction.

In the operation of the ISDN telephone 136, the input frame buffer 500 receives a data packet each frame from the serial bus host controller 130 at the serial bus data rate. The serial bus data rate with respect to the telephone interface 136 is determined by dividing the number of data bits (192 bits) sent each frame by the frame time period. For example, assuming a frame period of exactly 1.0 ms, the serial bus data rate is 192/1.0 ms, or 192 kbps. Thus, if the serial bus clock and the ISDN clock are in perfect synchronization, the data rates will be equal and overruns or underruns will not occur. In the preferred embodiment in FIG. 5A, data is removed from the frame buffer 500 and provided to the elasticity buffer 504 at the serial bus data rate, i.e. 192 bits/frame. The elasticity buffer 504 is preferably a FIFO-style buffer and is initialized by conveniently filling the elasticity buffer 504 about half way. For example, for the preferred 9-bit elasticity buffer, data is clocked into the first 5 bits. Thereafter, data is removed from the elasticity buffer 504 at the ISDN data rate, i.e. 192 kbps. Because the telephone interface 136 is an isochronous device, data is continually being transmitted over the telephone line, thus, the elasticity buffer has a steady stream of data flowing through it. If the data rates are not exactly equal, data will either accumulate or withdraw from the elasticity buffer 504 over several frames.

After the elasticity buffer is initialized, at each start of frame the number of data bits remaining in the elasticity buffer is determined. The remaining bits are then compared to the initialized number of bits to generate a response code. For example, the data bits remaining could result in response codes as shown in Table 2.

TABLE 2

| Buffer Contents | Response Code |
|---|---|
| 0 | 0xB |
| 1 | 0xC |
| 2 | 0xD |
| 3 | 0xE |
| 4 | 0xF |
| 5 | 0x0 |
| 6 | 0x1 |
| 7 | 0x2 |
| 8 | 0x3 |

In table 2, the response codes are calculated by adding 0xB to the number of bits remaining at each start of frame. For example, if 4 bits remain in the elasticity buffer after a start of frame indication, the response code is 0xE. It is noted that if the number of bits remaining is less than 5, then the serial bus data rate is slower with respect to the ISDN data rate. If the number of bits remaining after a start of frame is greater than 5, then the serial bus data rate is faster with respect to the ISDN data rate. The response code is then provided back to the host controller 130 in the response packet 308.

Figure 5B:
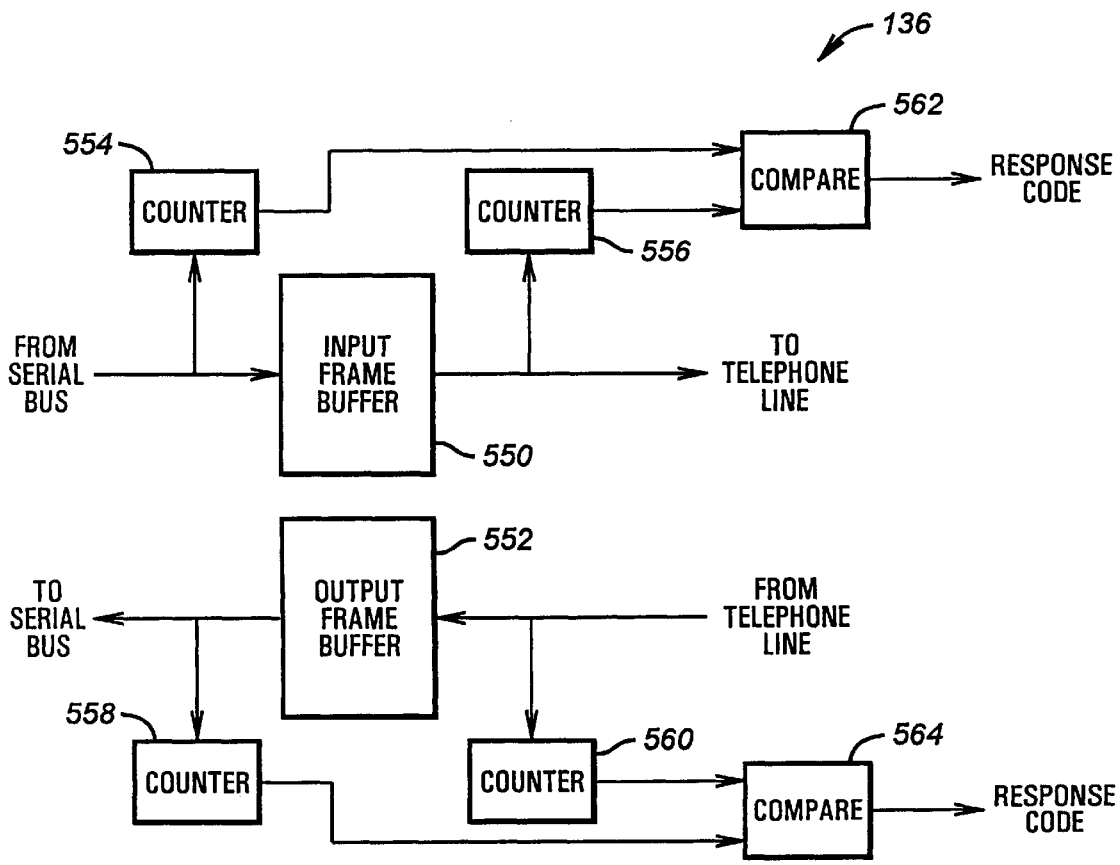

In an alternative embodiment shown in FIG. 5B, the response code is determined by the difference in the number of incoming and outgoing data bits of a frame buffer 550 and 552. A counter 554 counts incoming data bits to the frame buffer 550 and a counter 556 counts outgoing data bits. Incoming data is supplied at the serial bus data rate and outgoing data is provided at the ISDN data rate. Upon receipt of a SOF packet, the counts are compared by a comparator 562 to determine the difference in data rates and generate a response code, as for example, the response codes shown in Table 2. The response code is supplied back to the host controller 130 in the response packet 308. Each counter is also reset upon start of frame. It is understood that although counters 558 and 560 and comparator 564 circuitry are not described, they operate in a similar fashion to that of the input buffer circuitry. Thus, in this alternative embodiment, the elasticity buffers are effectively included in the frame buffers to provide the same results.

Figure 6A:
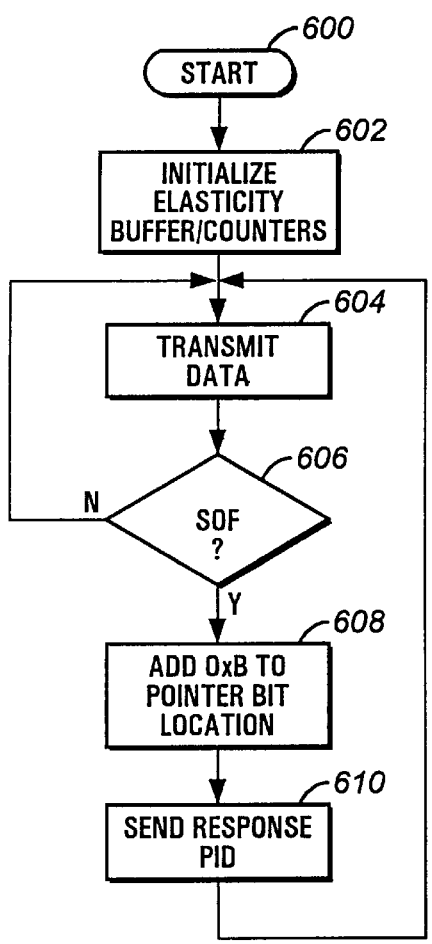
FIG. 6A is a flow diagram illustrating a sequence of events on a serial bus function for determining data rate variances and issuing a response.

Considering the above described preferred embodiment, the operation of the SOF response packet can best be explained with reference to FIGS. 6A and 6B. FIG. 6A illustrates a sequence of steps for generating the SOF response by the telephone interface 136. Referring briefly to FIG. 2, it is understood that SOF response generation is a cooperative effort by the device interface 208 and the device software 210. However, it is contemplated that the entire effort can be accomplished in the hardware based device interface 208.

The following sequence is described with reference to the input frame buffers of the telephone interface 136, but it is understood that the output frame buffers operate similarly with an opposite data flow. The sequence starts at step 600 and proceeds to step 602 where the elasticity buffer is initialized. In the alternative embodiment, the counters are initialized, or reset. The sequence then proceeds to step 604 where a bit of data from the elasticity buffer is transmitted according to the ISDN transfer rate. The sequence then proceeds to step 606 to determine if a SOF packet was received. If not, the sequence returns to step 604 to transfer another bit of data. Concurrently with steps 604 and 606, it is understood that data is being received into the elasticity buffer at the serial bus data rate. The sequence of steps 604 and 606 continue for the entire frame. If at step 606 it is determined that an SOF packet is received, then the sequence proceeds to step 608 where the response code is generated according to the above described embodiments. At this point, an entire frame of data has been transferred by the isochronous device. If the serial bus data rate is faster than the ISDN data rate, a number of accumulated data bits will appear in the elasticity buffer. If the serial bus data rate is slower than the ISDN data rate, the number of initialized data bits in the elasticity buffer will be reduced. For example, if the elasticity buffer was initialized with 5 data bits, locations 0–4, and if after a frame transfer only four data bits remained in the elasticity buffer, then the serial bus data rate is slower than the ISDN data rate. In this example, the next bit to be transferred is located in the third bit position and a response code of 0xE is thus generated.

After the response code is determined, the sequence proceeds to step 610 where the SOF response packet is sent to the host controller 130 in response to the SOF packet. Next, the sequence returns to step 604 to transmit the next frame of data.

Figure 6B:
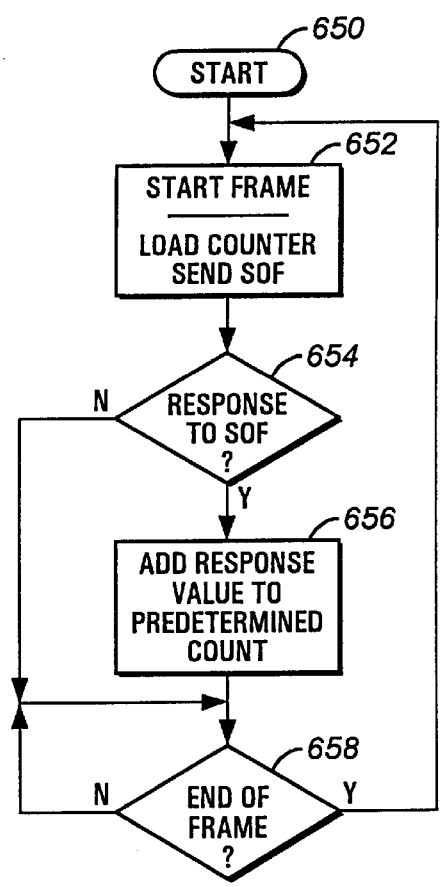
FIG. 6B is a flow diagram illustrating a sequence of events on a host controller for modifying frame timing.

FIG. 6B illustrates a sequence of events for modifying the serial bus frame period. It is understood that the SOF packet generation is a cooperative effort by the host interface 204 and the device software 202. However, it is contemplated that the entire effort can be accomplished in the hardware based device interface 204. The host controller 130 begins the sequence at step 650 and proceeds to step 652 where a start of frame packet is broadcast to all the serial bus devices. Next the sequence proceeds to step 654 where it is determined if a response to the SOF packet is received. Generally, a response will not be sent by any serial bus device since most serial bus devices use the SOF packet to synchronize to the serial bus. However, if an isochronous device with an external clock source is connected to the serial bus, such as the telephone interface 136, a response may be provided. If at step 654 it is determined that a response was sent, then the sequence proceeds to step 656 where the response code is factored into the count value, as shown in Table 1. For example, if the response code was 0xE, a count value of 11,998 would be generated resulting in an effective frame period of 11,999 serial bus clock cycles. Thus, with respect to the ISDN clock rate, the serial bus clock rate has been increased by 0.0083%, thereby increasing the serial bus data rate. The sequence then proceeds to step 658 where it is determined if the frame timer has counted down to the end of frame. If not, the sequence loops at step 658. If so, the sequence returns to step 652 where the frame timer is loaded with the next count value. It is noted that the response code provided by the telephone interface 136 is not loaded into the frame timer until the next frame, so some delay is inherent. However, because the clock variations are very small and data accumulation or withdrawal with respect to the elasticity buffer builds gradually over many frames, the delay does not negatively impact the ability to counteract the variations.

Thus, since the telephone interface 136 cannot modify its ISDN clock, the telephone interface 136 provides a SOF response packet in response to the host controller 130 issued SOF packet. Thereby, the host controller 130 modifies the frame timing to synchronize the serial bus data rate to the ISDN data rate.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim as follows:

1. A method of synchronizing a serial bus data rate to a data rate of a serial bus function, the method comprising the steps of:

providing a clock tick at the beginning of a basic time period;

transferring a number of data bits between the serial bus and a first port of a dual-ported buffer during the basic time period;

transferring data bits between a second port of the dual-ported buffer and the serial bus function at the serial bus function data rate;

providing a response to said clock tick for indicating a modification value based on an accumulation of data bits in the buffer from a single directional flow of data; and modifying the frequency of the clock tick based on the provided modification response value to adjust the basic time period so that the number of data bits transferred between the serial bus and the buffer during the basic time period equalizes with the serial bus function data rate.

2. The method of claim 1, wherein the modification response value is provided by the serial bus function.

3. The method of claim 1, wherein the buffer includes an elasticity buffer, the elasticity buffer being initialized with a predetermined number of data bits at the beginning of a basic time period, and wherein the response providing step further includes a comparison of a remaining number of data bits in the elasticity buffer and the predetermined number of data bits.

4. The method of claim 1, wherein each port of the buffer includes a counter for counting data bits flowing through the port, and wherein said response providing step indicates the modification response value based on a comparison of counter values.

5. The method of claim 1, wherein the clock tick is provided by a timer by loading a count value, and wherein said frequency modifying step provides the modified count value based on the modification response value.

6. An apparatus for synchronizing a serial bus data rate to a data rate of a serial bus function, the apparatus comprising:

a periodic timer for providing a clock tick at the beginning of a basic time period;

a dual-ported data buffer having a first port coupled to a serial bus for transmitting a number of data bits between the serial bus and the buffer during the basic time period, and having a second port coupled to a serial bus function for transmitting data between the buffer and the serial bus function at the serial bus function data rate;

a function controller operable to provide a response to said clock tick for indicating a modification value based on an accumulation of data bits in the buffer from a single directional flow of data; and a host controller operable to modify the frequency of the clock tick based on the provided modification response value to adjust the basic time period so that the number of data bits transferred between the serial bus and the buffer during the basic time period equalizes with the serial bus function data rate.

7. The apparatus of claim 6, wherein the modification response value is provided by the serial bus function.

8. The apparatus of claim 6, wherein the buffer includes an elasticity buffer, the elasticity buffer being initialized with a predetermined number of data bits at the beginning of a basic time period, and wherein the function controller further includes a comparator operable to compare a remaining number of data bits in the elasticity buffer and the predetermined number of data bits.

9. The apparatus of claim 6, wherein each port of the buffer includes a counter for counting data bits flowing through the port, and wherein said function controller indicates the modification response value based on a comparison of counter values.

10. The apparatus of claim 6, wherein the clock tick is provided by a timer by loading a count value, and wherein said host controller is further operable to provide the modified count value based on the modification response value.

11. A method of synchronizing a serial bus clock of a host controller to an independent clock of a serial bus function, the method comprising the steps of:

said host controller providing a clock tick at the beginning of a basic time period;

said serial bus function providing a response to said clock tick; and said host controller modifying said serial bus clock based on said response.

12. The method of claim 11, wherein said response provides an indication to said host controller for synchronizing said serial bus clock to said serial bus function clock.

13. The method of claim 12, wherein said indication includes a value to modify said basic time period.

14. The method of claim 13, wherein said serial bus function includes a data buffer and an input/output port, the input/output port functioning from the serial bus function clock, the method further comprising the steps of:

transferring a first number of data bits between said host controller and said data buffer during said basic time period at said serial bus clock rate;

transferring a second number of data bits between said data buffer and said input/output port of said serial bus function at said serial bus function clock rate; and after said clock tick, said serial bus function determining said indication based on a difference between said first and second numbers of data bits transferred during said basic time period.

15. A computer system for synchronizing a serial bus data rate to a data rate of a serial bus function, the computer system comprising:

an external isochronous serial bus device, comprising:
a periodic timer for providing a clock tick at the beginning of a basic time period;
a dual-ported data buffer having a first port coupled to a serial bus for transmitting a number of data bits between the serial bus and the buffer during the basic time period, and having a second port coupled to a serial bus function for transmitting data between the buffer and the serial bus function at the serial bus function data rate; and a function controller operable to provide a response to said clock tick for indicating a modification value based on an accumulation of data bits in the buffer from a single directional flow of data;

a host controller operable to modify the frequency of the clock tick based on the provided modification response value to adjust the basic time period so that the number of data bits transferred between the serial bus and the buffer during the basic time period equalizes with the serial bus function data rate; and a hard disk system coupled to said host controller for providing storage.

16. The computer system of claim 15, wherein the modification response value is provided by the serial bus function.

17. The computer system of claim 15, wherein the buffer includes an elasticity buffer, the elasticity buffer being initialized with a predetermined number of data bits at the beginning of a basic time period, and wherein the function controller further includes a comparator operable to compare a remaining number of data bits in the elasticity buffer and the predetermined number of data bits.

18. The computer system of claim 15, wherein each port of the buffer includes a counter for counting data bits flowing through the port, and wherein said function controller indicates the modification response value based on a comparison of counter values.

19. The computer system of claim 15, wherein the clock tick is provided by a timer by loading a count value, and wherein said host controller is further operable to provide the modified count value based on the modification response value.

20. A computer system for synchronizing a serial bus data rate to a data rate of a serial bus function, the computer system comprising:

a host controller for communicating to said isochronous device, comprising:
a periodic timer for providing a clock tick at the beginning of a basic time period; and
a dual-ported data buffer having a first port coupled to a serial bus for transmitting a number of data bits between the serial bus and the buffer during the basic time period, and having a second port coupled to a serial bus function for transmitting data between the buffer and the serial bus function at the serial bus function data rate;

an external isochronous device operable to provide a response to said clock tick for indicating a modification value based on an accumulation of data bits in the buffer from a single directional flow of data; and a hard disk system coupled to said host controller for providing storage,
wherein said host controller is operable to modify the frequency of the clock tick based on the provided modification response value to adjust the basic time period so that the number of data bits transferred between the serial bus and the buffer during the basic time period equalizes with the serial bus function data rate.

21. The computer system of claim 20, wherein the modification response value is provided by the serial bus function.

22. The computer system of claim 20, wherein the buffer includes an elasticity buffer, the elasticity buffer being initialized with a predetermined number of data bits at the beginning of a basic time period, and wherein the function controller further includes a comparator operable to compare a remaining number of data bits in the elasticity buffer and the predetermined number of data bits.

23. The computer system of claim 20, wherein each port of the buffer includes a counter for counting data bits flowing through the port, and wherein said function controller indicates the modification response value based on a comparison of counter values.

24. The computer system of claim 20, wherein the clock tick is provided by a timer by loading a count value, and wherein said host controller is further operable to provide the modified count value based on the modification response value.

* * * * *